United States Patent [19]

Yogev

[11] 4,408,459

[45] Oct. 11, 1983

[54] HEAT STORAGE POND AND POWER PLANT USING SAME

[76] Inventor: Amnon Yogev, c/o Hoffman & Sandler, 2361 Jeff Davis Hwy., Arlington, Va. 22202

[21] Appl. No.: 227,743

[22] Filed: Jan. 23, 1981

Related U.S. Application Data

[63] Continuation of Ser. No. 899,815, Apr. 25, 1978, abandoned.

[30] Foreign Application Priority Data

May 9, 1977 [GB] United Kingdom ............... 19401/77

[51] Int. Cl.³ .............................................. F03G 7/02
[52] U.S. Cl. .................................. 60/641.8; 126/415; 126/430
[58] Field of Search ............... 60/641.8; 126/415, 433, 126/430, 436

[56] References Cited

U.S. PATENT DOCUMENTS 3,933,628  1/1976  Vavani ........................... 126/415 X
4,091,800  5/1978  Fletcher et al. .................... 126/415
4,121,567 10/1978  Carson ............................... 126/415
4,138,992  2/1979  Shaffer et al. .................. 126/415 X

FOREIGN PATENT DOCUMENTS 308276  8/1971  U.S.S.R. ............................. 126/415

Primary Examiner—Allen M. Ostrager
Assistant Examiner—Stephen F. Husar
Attorney, Agent, or Firm—Sandler & Greenblum

[57] ABSTRACT

A heat storage pond comprises a heat storage liquid covered by a non-liquid insulating layer that floats on the liquid and is thick enough to thermally insulate the latter against significant conductive heat loss to an ambient medium above the insulating layer which may be an aqueous or a non-aqueous gel. The medium above the gel may be a layer of water which operates as a heat sink for a power plant whose heat source is the heat storage layer. The power plant may include a heat engine, such as an organic working fluid turbine, which extracts heat from the heat storage liquid, the layer of water above the gel serving as a condenser for the turbine.

22 Claims, 2 Drawing Figures

HEAT STORAGE POND AND POWER PLANT USING SAME

This is a continuation of application Ser. No. 899,815 filed Apr. 25, 1978, now abandoned.

BACKGROUND OF THE INVENTION

This invention relates to heat storage ponds such as solar collectors, and to power plants utilizing the same.

A body of water provided with a surface mechanism that suppresses convection currents acts as an insulator for heat accumulated in the body of water. When the heat is produced at the absorption of solar radiation, the body of water is termed a solar pond. In the absence of such a mechanism, heat added to the lower level of the body of water is transferred by convection currents to the upper level where transfer to the environment takes place by radiation and/or by conduction at the liquid-air interface. As a consequence, the vertical temperature gradient in a body of water, in which convection currents are not suppressed, is too small to be of practical value in operating a power plant.

A conventional mechanism for suppressing convection currents is achieved by establishing and maintaining a halocline above a heat storage zone in a body water. The halocline is a layer of water containing a salt concentration whose density gradient is in the direction of gravity. The halocline permits a corresponding temperature gradient to be established in the halocline as solar radiation is absorbed thereby enabling the halocline to act as a thermal barrier or insulation layer protecting the heat storage zone therebelow against conductive heat loss to the environment above the halocline. As a consequence, the water near the surface remains relatively cool as the water near the darkened bottom is heated. In such case, the resultant temperature differential is sufficiently large to allow operation of a heat engine that converts some of the absorbed solar heat to work.

The basic problem with this approach is the time-wise instability of the density gradient which can be maintained over long periods of time only by cycling different concentrations of solution between various levels of the pond. Furthermore, great care must be exerted in extracting heat from the pond so as not to disturb the density gradient. Much effort has been devoted to equipment for stabilizing density gradients in solar ponds, but the equipment of the prior art remains complicated with a result that long term reliability is relatively low and the solar pond concept has not been widely adopted for collecting solar heat. Therefore, it is an object of the present invention to provide a new and improved heat storage pond, and to provide a power plant utilizing the same, wherein the deficiencies of prior art solar ponds are overcome or substantially diminished.

In accordance with the present invention, there is provided a heat storage pond comprising a heat storage liquid at a temperature higher than an ambient medium, and an insulating layer that floats on the liquid and is thick enough to thermally insulate the latter against significant conductive heat loss to the ambient medium above the insulating layer. The insulating layer can be non-liqud, and preferably is a gel that is transparent to visible light and near infra-red rays from the sun which are absorbed by the heat storage liquid which can be water or a salt hydrate.

A suitable aqueous gel includes cross-linked polyacrylamide, while suitable non-aqueous gels can be formed from hydrocarbon liquids such as kerosene, paraffin oil or silicone oil. Gels formed from such hydrocarbon liquids include cross-linked polyisobutilene.

In one embodiment of the invention, the ambient medium above the gel is a layer of water which transmits most of the visible light and near infra-red components of the solar radiation. The layer of water thus remains relatively cool as compared to the temperature of the heat storage liquid which is heated by the absorption of solar radiation.

An aqueous gel may be produced in situ by adding acrylamide to a segregated layer of water above the heat storage liquid together with a polymerizing agent and an agent that produces cross-linking. Alternatively, a non-aqueous gel can be produced by polymerizing isobutilene in a kerosene base in the presence of an agent that produces cross-linking. This latter gel has the advantage of having a heat conductivity that is approximately 50% of the heat conductivity of a water based gel, and as a consequence, better insulates the heat storage liquid. Finally, the heat storage liquid can be contained in a depression in the earth, or can be contained in a tank. Alternatively, the heat storage liquid can be a body of water, natural or artificial.

The invention also consists in a solar power plant utilizing a heat storage pond in accordance with the present invention including a heat engine for extracting heat from the heat storage liquid. Preferably, the heat engine rejects heat into the layer of water above the gel. In the preferred embodiment of the invention, the working fluid of the heat engine is different from the heat storage liquid. In such case, the heat engine includes a first heat exchanger in thermal contact with the heat storage liquid for heating the working fluid, an energy converter responsive to the passage of heated working fluid for converting some of the heat in the working fluid into work, and a second heat exchanger in thermal contact with the layer of water over the gel for condensing the working fluid after it passes through the converter. Preferably, the working fluid is an organic fluid and the heat engine is a turbine.

BRIEF DESCRIPTION OF THE DRAWING

Embodiments of the invention are described in the accompanying drawing where.

DESCRIPTION OF PREFERRED EMBODIMENTS

Figure 1:
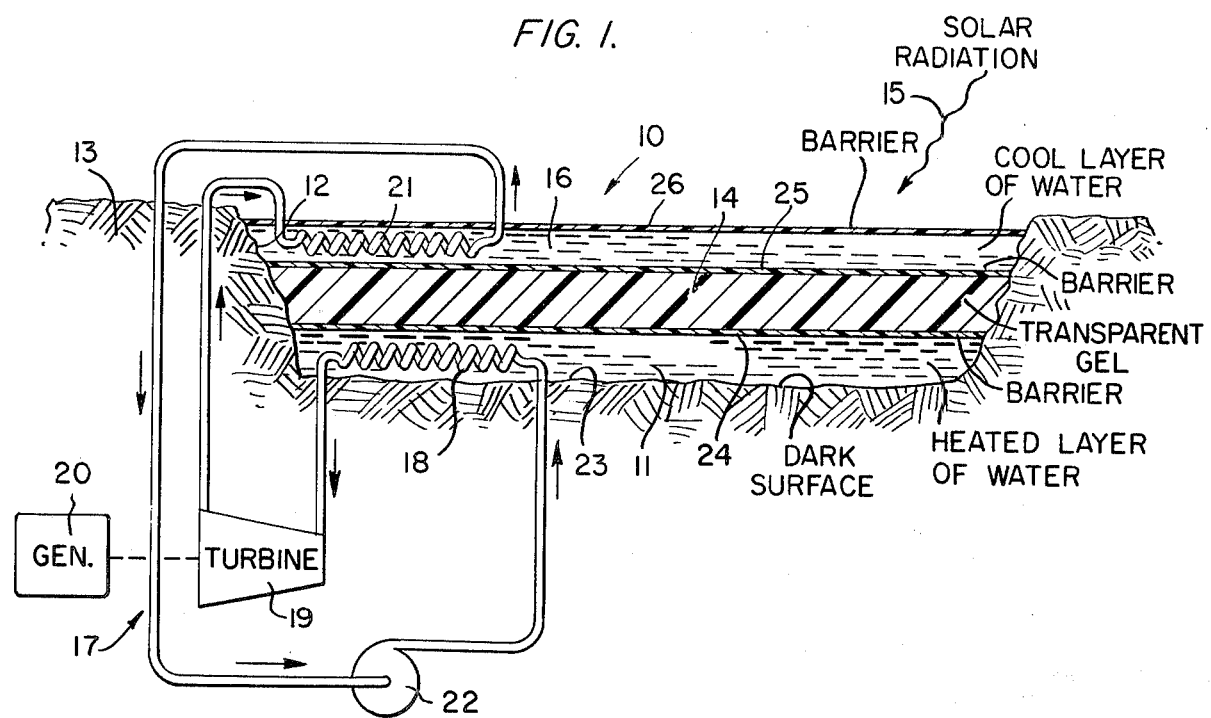
FIG. 1 is a cross-section of a solar collector according to the present invention installed in a depression in the earth, and a power plant utilizing the same.

Referring now to the drawing, reference number 10 designates a heat storage pond in the form of a solar collector according to the present invention installed in a depression in the earth. The pond includes a heat storage liquid in the form of a first layer of water 11 in a depression 12 in earth 13, layer 11 being covered by a layer 14 of a gel that is stable in the presence of, and transparent to, solar radiation indicated by reference numeral 15. The visible and near infra-red components of the solar radiation are absorbed preferentially in layer 11 such that the temperature of the water in this layer is elevated. The gel is thick enough to thermally insulate the first layer of water from significant conductive heat loss to the ambient medium above layer 14. The earthen sides and bottom of depression 12 act to insulate the sides and bottom of layer 11 from heat loss. As a consequence, layer 11 can be held at approximately 100° C. while the ambient medium above layer 14 is about 20° C. or less.

The above described arrangement is suitable for collecting solar heat and is readily adapted to a collector for a power plant. Referring again to the drawing, the ambient medium above layer 14 is preferably a second layer of water 16 which is substantially transparent to visible and near infra-red radiation and remains at substantially ambient air temperature due to its proximity with the air. If evaporation is accounted for, barrier 26 may be dispensed with to take advantage of wind mixing to maintain a substantially constant temperature in layer 16. As a consequence, a relatively large temperature differential will exist between layer 11 and layer 16, the differential being maintained by the insulating nature of the layer of gel 14.

The preferred form of the power plant includes a heat engine for extracting heat from the first layer of water 11, which acts as a heat source, and rejecting heat into the second layer of water 16, which acts as a heat sink. Preferably, heat engine 17 is a closed loop, Rankine-cycle heat engine, utilizing a working fluid different from the water of the collector. First heat exchanger 18 of the heat engine is in thermal contact with layer 11 for heating the working fluid of the heat engine. Energy converter 19, which is shown in the form of a turbine driving a generator 20, is responsive to the passage of heated working fluid for converting some of the heat in the working fluid into useful work in the form of electricity. A second heat exchanger 21 in thermal contact with the second layer of water 16 condenses the working fluid exhausted from turbine 19 and furnishes the condensed working fluid to a pump 22 which returns the condensate to heat exchanger 18. Heat engine 17 can take the form shown in U.S. Pat. Nos. 3,393,515 and 3,409,782, where the working fluid is an organic liquid.

Figure 2:
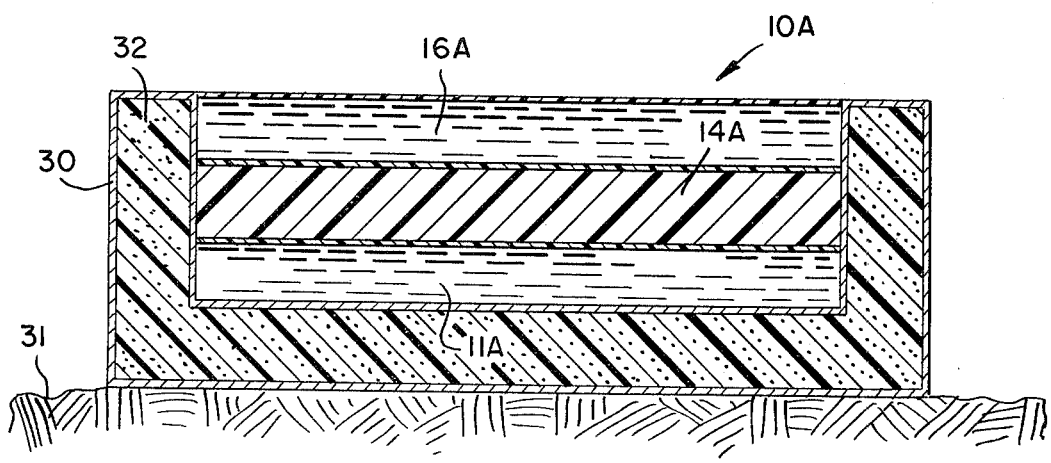
FIG. 2 is a cross-section of a free-standing solar collector according to the present invention.

Solar colector 10 can be of any transverse size consistent with the total amount of heat to be accumulated in a given time and logistics associated with the in situ creation of thermal barrier 14 to be described below. The collector can be created by a simple mechanized scraping of the earth 13 to form depression 12 about a meter deep, although this dimension is not critical. Where necessary, the bottom and the sides of the depression 12 can be treated to water-proof the same, the bottom 23 of the depression being darkened by the addition of carbon black or by laying black plastic sheeting on the surface of the earth. The water layer 11 can be blackened by the addition of material that remains in suspension in order to increase the heat absorption capacity of the layer. Alternatively, layer 11 can be an existing body of water wherein the gel layer floats on the surface, or a shallow tank can be built on the ground as indicated in the embodiment of FIG. 2.

When the collector is created by forming a depression in the earth, first layer 11 is formed by partially filling the depression with water. Preferably, this layer is 25–30 centimeters deep and is covered with a barrier 24 in the form of a continuous sheet of transparent plastic material, such as polyethylene. Liquid, preferably water, is then added to form a layer about 60 centimeters deep; and a gel is created in situ as described below by a process of polymerization and cross-linking of a suitable compound. After the gel has been created, it is covered with a barrier 25 and the second layer of water 16 about 25–30 centimeters deep is added. The surface of layer 17 is covered with a barrier 26 such as a plastic sheet or a plastic dome to reduce evaporation losses of layer 16. When completed, the three layer collector has a first layer of water separated from the second layer of water by a thermal barrier in the form of a gel. The layer of gel 14 is preferably created in situ by adding an active ingredient to a liquid layer in such small quantities that the thermal conductivity of the resultant gel is about the same as the liquid.

In one form of the invention, a hydro-gel is utilized. In such case, the liquid used is water and the active ingredient comprises from 1% to 10% of the weight of the water in the layer. Thus, a solar collector can be created in a remote location merely by transporting sufficient active ingredient to the remote location. For a hydro-gel, an example of active ingredient is acrylamide which can be polymerized in siut in a conventional manner in the presence of an agent for cross-linking the polyacrylamide so formed. Conventional techniques for polymerization of acrylamide are disclosed in the following references: Maizel, J. N., METHODS IN VIROLOGY, Vol. V (1971), p. 179; and Laemmue, U.R., NATURE, 227 (1970), p 680.

When an existing body of water is to be converted into a solar collector, the gel layer can be created first by adding suitable materials to the body of water. After polymerization and cross-linking have taken place, water can be pumped beneath the gel to establish the first layer.

The second embodiment 10A of the invention shown in FIG. 2 comprises a tank 30 resting on ground 31, the tank being insulated at 32. Contained within the tank is a heat storage layer 11A beneath gel layer 14A, these layers being separated by a barrier like that shown at 24 in FIG. 1. If pond 10a is to function as a source of hot water only, layer 16A of water is not utilized, and a barrier on the top surface of the gel may be provided to keep the gel clean.

A non-aqueous gel can also be utilized, and in particular, a hydrocarbon gel can be used. The polymerization and cross-linking may be done in situ, as for example by forming polyisobutilene from kerosene. The advantage of using a kerosene based gel rather than a water based gel arises from the fact that the insulating quality of kerosene is about twice that of water. Consequently, less of a kerosene based gel is required to achieve the same thermal insulation as a water based gel.

Hydrocarbon liquids other than kerosene, such as parafin or silicon oils, are suitable bases for forming a non-aqueous gel. Whichever hydrocarbon liquid is used, the resultant gel would include cross-linked polyisobutilene. Finally, in an alternative arrangement, the first layer, which preferentially absorbs heat, can be a salt hydrate with a melting point in the temperature range in which the working fluid of the heat engine operates.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

I claim:

1. A heat storage pond comprising a heat storage liquid which receives heat and is raised to a temperature higher than that of an ambient medium, an insulating layer of gel that floats on the liquid and is thick enogugh to thermally insulate the latter against significant conductive heat loss to the ambient medium above the insulating layer, wherein the gel is non-aqueous and is produced from a hydrocarbon liquid.

2. A heat storage pond according to claim 1 wherein the hydrocarbon liquid is kerosene.

3. A heat storage pond according to claim 1 wherein the hydrocarbon liquid is selected from a group of liquids comprising kerosene, paraffin oil, and silicone oil.

4. A heat storage pond according to claim 1 wherein the gel includes cross-linked polyisobutylene.

5. A heat storage pond comprising a heat storage liquid which receives heat and is raised to a temperature higher than that of an ambient medium, means for effecting heating of the liquid by its absorption of solar radiation including a gel, transparent to solar radiation, covering the liquid and thick enough to thermally insulate the heat storage liquid against significant conductive heat loss to the ambient medium above the gel, the ambient medium being a layer of water.

6. A heat storage pond according to claim 5 including a barrier substantially impervious to water between the gel and said layer of water.

7. A heat storage pond according to claim 6 including a barrier substantially impervious to water between said layer of water and ambient air.

8. A method of forming a heat storage pond of the type having a heat storage liquid of water which receives heat and is raised to a temperature than that of an ambient medium, and an insulating layer of gel that floats on the liquid and is thick enough to thermally insulate the latter against significant conductive heat loss to the ambient medium above the insulating layer, including the steps of forming the gel on a barrier and then pumping water beneath the barrier so that the gelbarrier floats on the water which forms the heat storage layer.

9. A heat storage pond comprising a heat storage liquid, a gel transparent to solar radiation covering the liquid for insulating the same, the interface between the gel and the liquid being a barrier impermeable to water but transparent to solar radiation for effecting the heating of the heat storage liquid by its absorption of solar radiation, a second barrier impermeable to water but transparent to solar radiation covering the gel, and a layer of water on the second barrier.

10. A heat storage pond according to claim 9 including a medium interposed between the gel and the heat storage liqquid, the medium being transparent to solar radiation.

11. A power plant utilizing a heat storage pond wherein said heat storage pond includes:
(a) a heatable heat storage liquid;
(b) an insulating layer on the heat storage liquid for thermally insulating said heat storage liquid; and
(c) a layer of liquid on said insulating layer in thermal relationship to an ambient medium above said layer of liquid, wherein said power plant includes a heat engine for extracting heat from said heat storage liquid and rejecting heat into said layer of liquid.

12. A heat storage pond according to claim 11 wherein said layer of liquid is transparent to solar radiation incident thereon for causing differential heating of the heat storage liquid to a relatively high temperature with repsect to said layer of liquid.

13. A heat storage pond according to claim 12 wherein the heat storage liquid is water.

14. A heat storage pond according to claim 12 wherein each of the heat storage liquid and said layer of liquid is water.

15. A power plant utilizing the heat storage pond of claim 14 including boiler means responsive to heat from the heat storage liquid for vaporizing an organic working fluid, a closed-cycle, organic fluid turbine which operates on the Rankine cycle and which is responsive to vaporized working fluid for driving a generator that produces electrical energy, and condensor means for condensing vapor exhausted from the turbine and returning the resultant condensate to the boiler means, cooling water for cooling the condensor means being supplied from said layer of liquid.

16. A heat storage pond according to claim 11 including an impermeable barrier between the insulating layer and the heat storage layer.

17. A power plant utilizing a heat storage pond wherein said heat storage pond includes:
(a) a heat storage liquid which receives heat and is raised to a temperature higher than that of an ambient medium;
(b) an insulating layer that floats on said liquid and is thick enough to thermally insulate said liquid against significant conductive heat loss to the ambient medium above the insulating layer, wherein said ambient medium is a layer of water and solar radiation that is incident on said layer of water causes differential heating of said heat storage liquid to a relatively high temperature with respect to said layer of water, and wherein said power plant includes a heat engine for extracting heat from said heat storage liquid and rejecting heat into said layer of water.

18. A power plant according to claim 17 wherein the heat engine operates on a closed Rankine-cycle utilizing a working fluid different from the heat storage liquid, and wherein the heat engine includes a first heat exchanger in thermal contact with the heat storage liquid for heating the working fluid, an energy converter responsive to the passage of heated working fluid for converting some of the heat into work, and a second heat exchanger in thermal contact with said layer of water for condensing the working fluid after it exits from the converter.

19. A power plant according to claim 18 wherein the converter includes a turbine, and the working fluid is an organic material.

20. A heat storage pond according to claim 17 wherein the heat storage liquid is water.

21. A heat storage pond according to claim 17 wherein the heat storage liquid is a molten salt hydrate.

22. A heat storage pond according to claim 21 wherein the melting point of the salt hydrate is comparable to the boiling point of water.

* * * * *

UNITED STATES PATENT AND TRADEMARK OFFICE
CERTIFICATE OF CORRECTION

PATENT NO. : 4,408,459
DATED : October 11, 1983
INVENTOR(S) : Amnon YOGEV

It is certified that error appears in the above-identified patent and that said Letters Patent is hereby corrected as shown below:

In Column 1, line 26, after "body" insert ---of---.

In Column 1, line 65, "non-liqud" should read ---non-liquid---.

In Column 4, line 19, "in siut" should read ---in situ---.

In Column 5, line 2, "engough" should read ---enough---.

In column 5, line 32, after "temperature" insert ---higher---.

In Column 5, line 39, "gelbarrier" should read ---gel/barrier---.

In Column 5, line 52, "liqquid" should read ---liquid---.

Signed and Sealed this

Eighth Day of May 1984

[SEAL]

Attest:

Attesting Officer

GERALD J. MOSSINGHOFF

Commissioner of Patents and Trademarks